(12) United States Patent
Roehr et al.

(10) Patent No.: US 10,837,488 B2
(45) Date of Patent: Nov. 17, 2020

(54) ROLLER BEARING ASSEMBLY FOR USE IN A FRACKING PUMP CRANK SHAFT

(71) Applicant: Roller Bearing Company of America, Inc., Oxford, CT (US)

(72) Inventors: George Roehr, Yardley, PA (US); James Prescavage, Hainesport, NJ (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 16/454,404

(22) Filed: Jun. 27, 2019

(65) Prior Publication Data

US 2020/0032838 A1    Jan. 30, 2020

Related U.S. Application Data

(60) Provisional application No. 62/702,517, filed on Jul. 24, 2018.

(51) Int. Cl.
*F16C 19/26*     (2006.01)
*F16C 33/46*     (2006.01)
(Continued)

(52) U.S. Cl.
CPC ............... *F16C 19/26* (2013.01); *F16C 9/02* (2013.01); *F16C 33/46* (2013.01); *F16C 33/526* (2013.01);
(Continued)

(58) Field of Classification Search
CPC ...... F16C 19/26; F16C 33/46; F16C 33/4647; F16C 33/523; F16C 33/526; F16C 33/58; F16C 2240/82
See application file for complete search history.

(56) References Cited

U.S. PATENT DOCUMENTS

| 4,023,988 A | 5/1977 | Stickels et al. |
| 4,124,412 A | 11/1978 | Elias et al. |

(Continued)

FOREIGN PATENT DOCUMENTS

| CN | 201347962 Y | 11/2009 |
| CN | 104879379 B | 2/2016 |

(Continued)

OTHER PUBLICATIONS

"Vacuum Degassing of Steel" by Vac Aero International, Dec. 5, 2017 https://vacaero.com/information-resources/vac-aero-training/101401-vacuum-degassing-steel.html.*

*Primary Examiner* — James Pilkington
(74) *Attorney, Agent, or Firm* — Murtha Cullina LLP

(57) ABSTRACT

A roller bearing assembly for use in a fracking pump crank shaft includes an inner ring being positioned an outer ring and a plurality of rolling elements disposed therebetween. Each of the rolling elements have a bore extending therein. The roller bearing assembly includes a cage having an annular disc with pins extending axially inward therefrom and into the bore. The pins are positioned on the annular disc so that the rolling elements are spaced apart from one another with a gap extending continuously therebetween. The gap is of a predetermined magnitude to maximize the number of rolling elements that fit between the inner ring and the outer ring to maximize load carrying capacity of the roller bearing assembly.

8 Claims, 5 Drawing Sheets

(51) Int. Cl.
  *F16C 33/52* (2006.01)
  *F16C 9/02* (2006.01)
(52) U.S. Cl.
  CPC ...... *F16C 2240/82* (2013.01); *F16C 2360/42* (2013.01)

(56) References Cited

U.S. PATENT DOCUMENTS

| | | | | |
|---|---|---|---|---|
| 5,658,666 | A * | 8/1997 | Abe | .................. F16C 33/30 164/459 |
| 6,502,486 | B1 | 1/2003 | Tenbrack et al. | |
| 7,090,405 | B2 | 8/2006 | Tsujimoto et al. | |
| 7,244,065 | B2 * | 7/2007 | Takaki | .................. B60B 27/00 384/523 |
| 7,883,273 | B2 * | 2/2011 | Otaka | .................. F16C 33/526 384/572 |
| 8,814,436 | B2 * | 8/2014 | Wendeberg | ............ F16C 19/40 29/898.06 |
| 9,145,917 | B2 | 9/2015 | Ishibashi | |
| 9,341,230 | B2 | 5/2016 | Peterson | |
| 9,657,779 | B2 | 5/2017 | Kokumai et al. | |
| 9,695,875 | B2 | 7/2017 | Parkinson | |
| 2004/0047528 | A1 | 3/2004 | Tsujimoto et al. | |
| 2008/0037924 | A1 * | 2/2008 | Zeidlhack | ............... F16C 19/26 384/574 |
| 2009/0235887 | A1 | 9/2009 | Oishi et al. | |
| 2014/0196570 | A1 | 7/2014 | Small et al. | |
| 2016/0348723 | A1 | 12/2016 | Tada | |
| 2018/0045244 | A1 | 2/2018 | Rode | |

FOREIGN PATENT DOCUMENTS

| | | |
|---|---|---|
| CN | 108603499 A | 9/2018 |
| EP | 1552173 B1 | 2/2011 |
| EP | 2791379 | 10/2014 |
| FR | 3046822 A1 | 7/2017 |
| GB | 2514445 B | 6/2015 |
| KR | 20150038087 A | 4/2015 |
| WO | 2004042245 A1 | 5/2004 |
| WO | 2013014280 A1 | 1/2013 |
| WO | 2013087379 A1 | 6/2013 |
| WO | 2014139941 A1 | 9/2014 |
| WO | 2017159467 A1 | 9/2017 |
| WO | 2019054448 A1 | 3/2019 |

* cited by examiner

ROLLER BEARING ASSEMBLY FOR USE IN A FRACKING PUMP CRANK SHAFT

CROSS REFERENCE TO RELATED APPLICATION

The instant application is a non-provisional of, and claims priority benefit to, U.S. Provisional Patent Application No. 62/702,517, entitled "A ROLLER BEARING ASSEMBLY FOR USE IN A FRACKING PUMP CRANK SHAFT" filed on Jul. 24, 2018, the entirety of which is incorporated by reference herein.

TECHNICAL FIELD

The present invention is directed to a bearing assembly for a fracking pump crank shaft, and more particularly directed to a bearing assembly supporting the crank shaft and having rolling elements rotatably mounted on pins in a cage to maximize the number of rolling elements in the bearing assembly. Additionally, the bearing ring components are fabricated from steel with controlled oxygen levels to further enhance service life.

BACKGROUND

Fracking pumps are specialized versions of reciprocating pumps. Fracking pumps include an eccentric crank shaft that utilizes two or more cylindrical roller bearings to rotatingly support the crank shaft to a frame at locations between the connecting rods. Typically roller bearings having up to a 50.8 centimeters (20) inch inside diameter are employed. The roller bearings used in fracking pumps generally employ a cage that spaces rollers therein apart from one another. The cage typically includes fingers or cross bars that extend between and take up space between adjacent rollers. Thus, the number of rollers that can be fit into the roller bearing is limited because of the space taken up by the fingers or cross bars of the cage. The dynamic load capacity is thus also limited because of the constraints on the number of rollers.

Roller bearings for fracking pumps are subject to severe loading conditions, thus the load capacity constraints can be detrimental to the life of the roller bearing. The size of the roller bearing for a fracking pump cannot be increased to increase load capacity because of space envelope constraint of the fracking pump frame.

Based on the foregoing, there is a need to provide an improved roller bearing for a fracking pump crank shaft that can withstand higher loads than traditional roller bearings.

SUMMARY

There is disclosed herein a roller bearing assembly for use in a fracking pump crank shaft. The roller bearing assembly includes an outer ring that has an inner raceway formed thereon and an inner ring that has an outer raceway formed thereon. The inner ring is positioned at least partially in the outer ring. The roller bearing assembly includes a plurality of rolling elements disposed between and in rolling engagement with inner raceway and the outer raceway. A first of the rolling elements has a first bore extending axially at least partially therethrough and a second of the rolling elements has a second bore extending axially therethrough. The roller bearing assembly includes a cage that has a first annular disc positioned axially outward from the plurality of rolling elements. A first pin extends axially inward from the first annular disc and a second pin extends axially inward from the first annular disc. The first pin extends into the first bore and the second pin extends into the second bore. The first pin and the second pin are positioned on the first annular disc so that the first of the plurality of rolling elements and the second of the plurality of rolling elements are spaced apart from one another with a gap extending continuously therebetween. The gap is of a predetermined magnitude to maximize the number of rolling elements that fit between the inner raceway and the outer raceway.

In one embodiment, the inner ring and/or the outer ring are made from a vacuum de-gassed steel having an oxygen content of less than 10 ppm.

In one embodiment, the cage includes a second annular disc positioned opposite the first annular disc and the plurality of rolling elements are positioned axially between the first annular disc and the second annular disc.

In one embodiment, the first bore extends entirely axially through the first of the rolling elements; and/or the second bore extends entirely axially through the second of the rolling elements.

In one embodiment, the first pin extends completely through the first bore; and/or the second pin extends completely through the second bore.

In one embodiment, the first pin and/or the second pin extend between and are secured to the first annular disc and the second annular disc.

In one embodiment, the first pin and/or the second pin extend between and are welded to the first annular disc and the second annular disc.

In one embodiment, an annular cavity is defined between the inner raceway and the outer raceway. The annular cavity has a circumferential volume and the plurality of rolling elements is maximized to occupy that circumferential volume by minimizing the gap between rolling elements within the constraints of the movement permitted between each of the respective roller bores and the corresponding pin.

In one embodiment, the first of the rolling elements is rotatably mounted on the first pin and the second of the rolling elements is rotatably mounted on the second pin.

In one embodiment, roller bearing assembly is configured to withstand a range of loads from zero to a predetermined percentage of the dynamic capacity of the bearing assembly, with the inner ring rotating at up to 300 rotations per minute.

DETAILED DESCRIPTION

Figure 1:
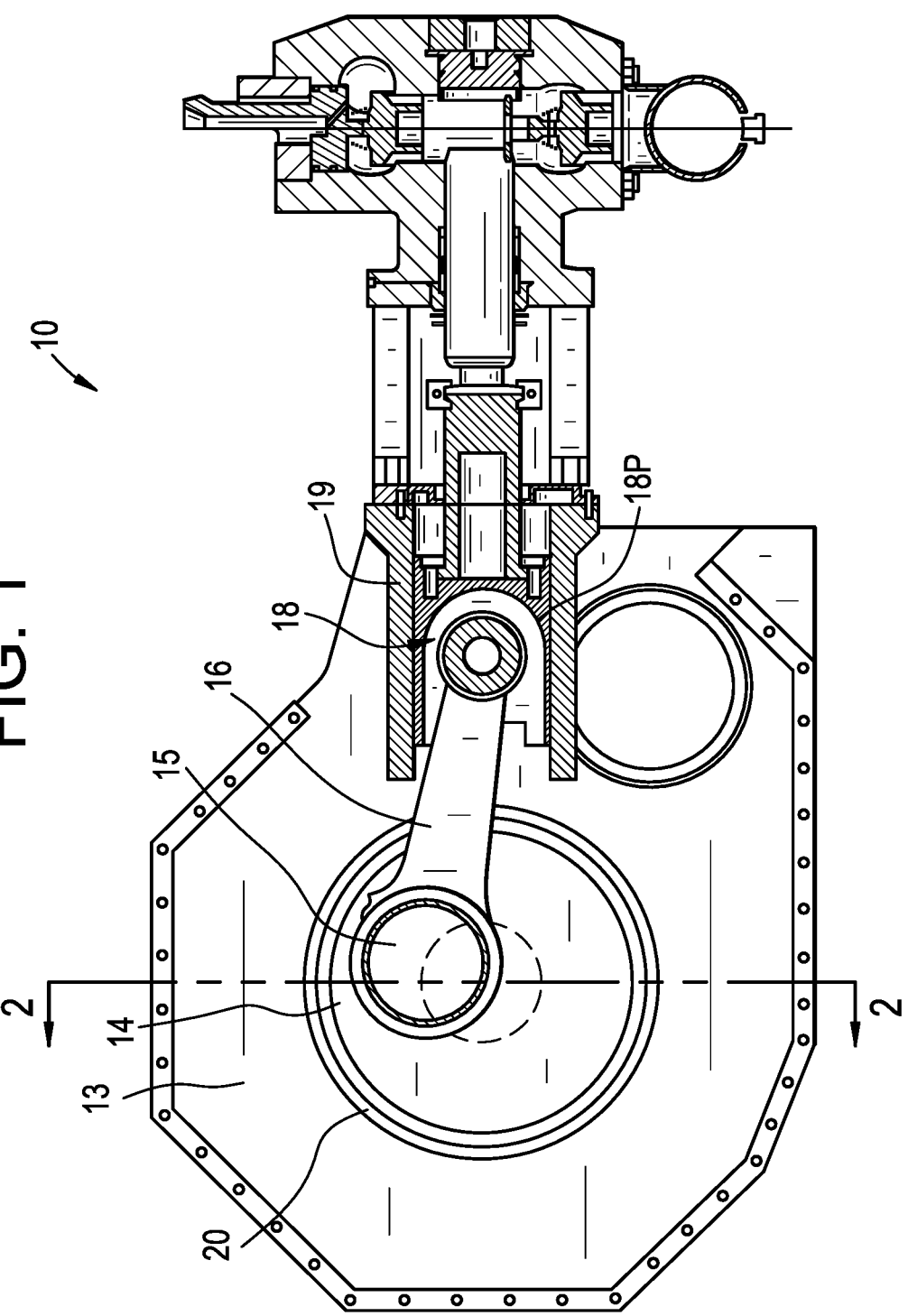
FIG. 1 is a perspective schematic view of a fracking pump having the bearing assembly of the present invention therein.
Figure 2:
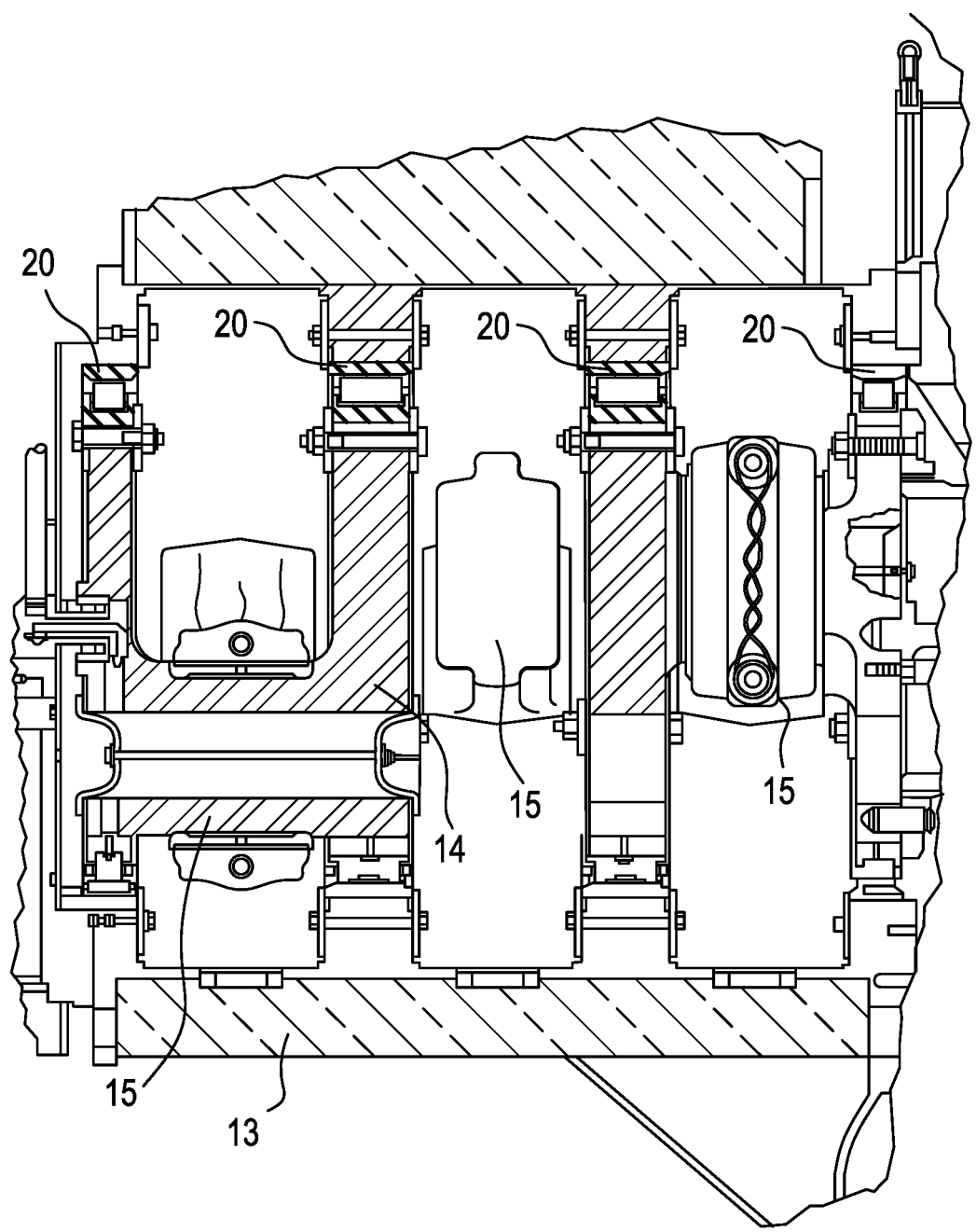
FIG. 2 is a front view of the crank shaft of the fracking pump of FIG. 1 taken across section 2-2.

As shown in FIG. 1, a fracking pump is generally designated by the numeral 10. The fracking pump has a crank shaft 14 that is rotatably supported in a frame 13 by two or more by roller bearings 20, also referred to as a crank support bearing (e.g., four roller bearings are shown, for example, in FIG. 2). The crank shaft 14 has several cams 15 eccentrically formed thereon and located between the roller bearings 20. A connecting rod 16 connects each of the cams 15 with a piston/cylinder arrangement 18 via a shaft 16. The crank shaft 14 is driven by a gear arrangement at one end of the shaft in what is referred to as the power section of the pump. Rotation of the crank shaft 14 is transformed into a reciprocating motion of the pistons 18P in the cylinder 19 to generate pressure in the fracking pump 10.

Figure 3:
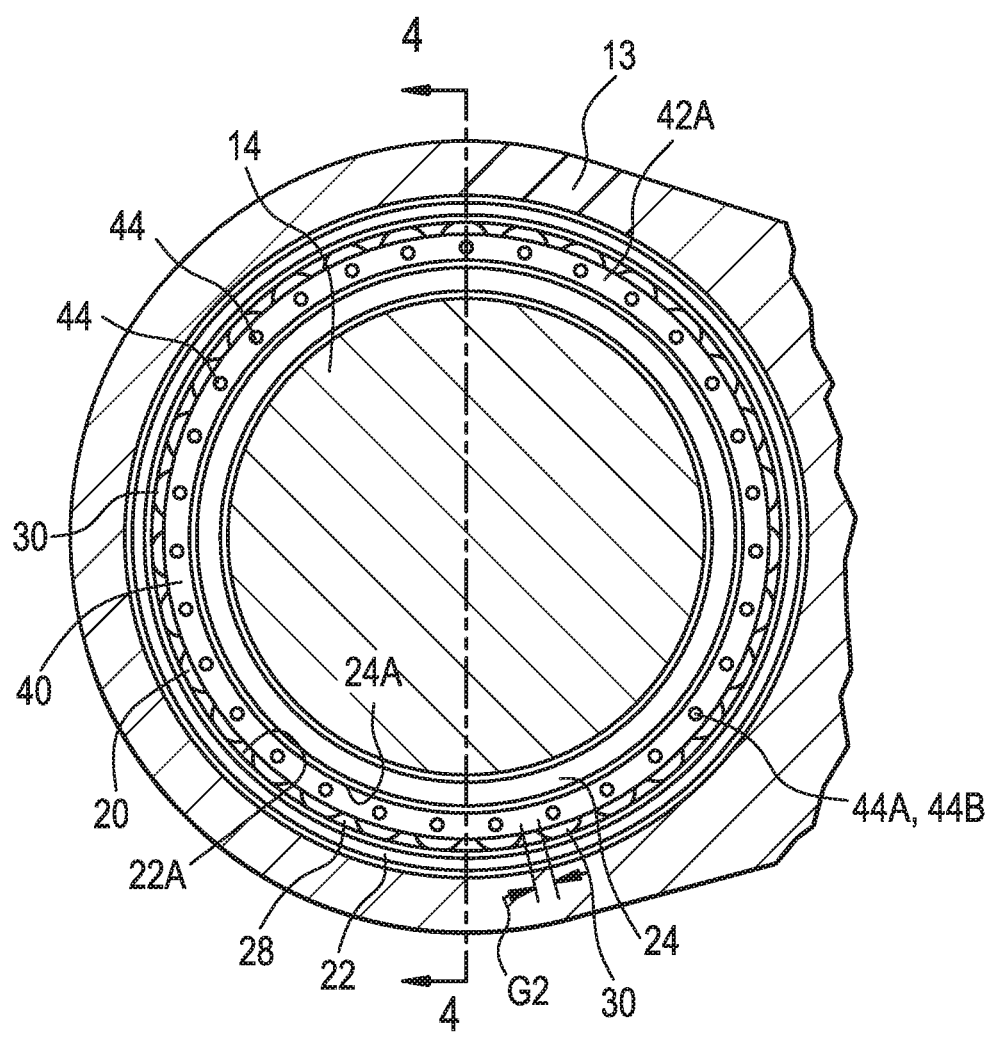
FIG. 3 is a cross sectional view of the bearing assembly of the present invention mounted on the crank shaft shown in FIGS. 1 and 2.
Figure 4:
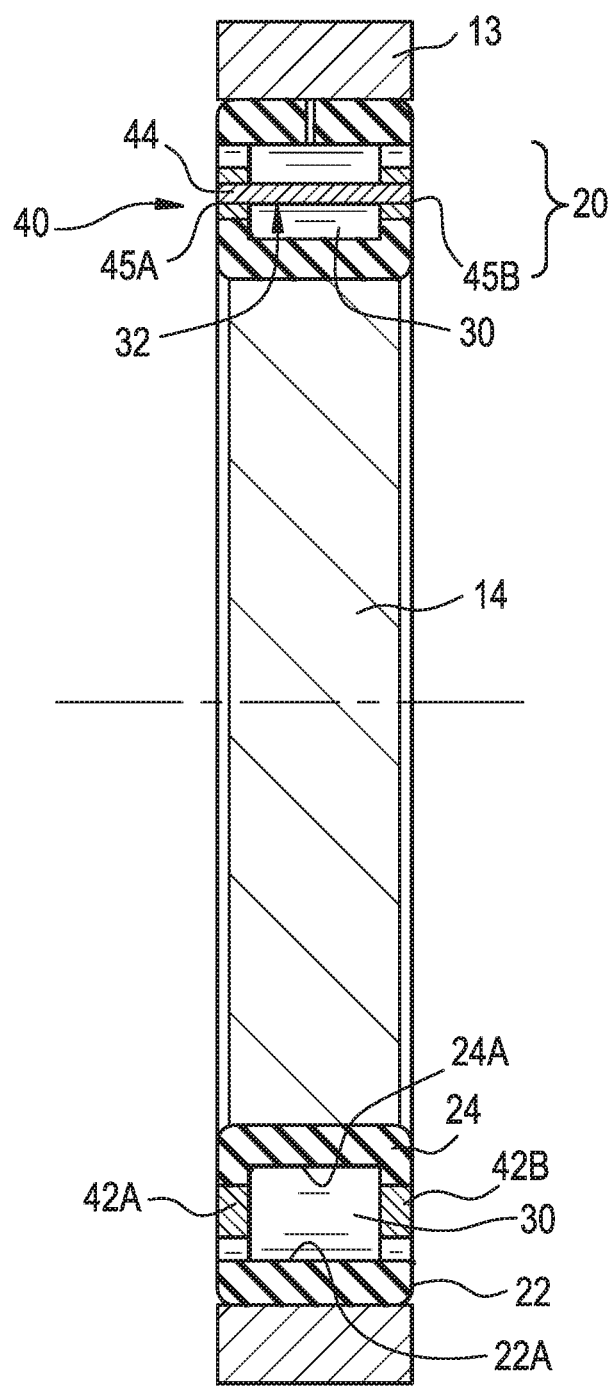
FIG. 4 is a cross sectional view of the bearing assembly taken across section 4-4 of FIG. 3.

As shown in FIGS. 3 and 4, the roller bearing assembly 20 includes an outer ring 22 having an inner raceway 22A. The roller bearing assembly 20 includes an inner ring 24 having an outer raceway 24A. The inner ring 24 is positioned at least partially in the outer ring 22. A plurality of rolling elements 30 are disposed between and are in rolling engagement with inner raceway 22A and the outer raceway 24A. Each of the rolling elements 30 has a bore 32 extending entirely axially therethrough from one axial end to an opposite axial end of the rolling element 30. While the bores 20 are shown and described as extending entirely axially therethrough from one axial end to an opposite axial end of the rolling element 30, the present invention is not limited in this regard as the bores may extend partially through the rolling elements 30.

Figure 5:
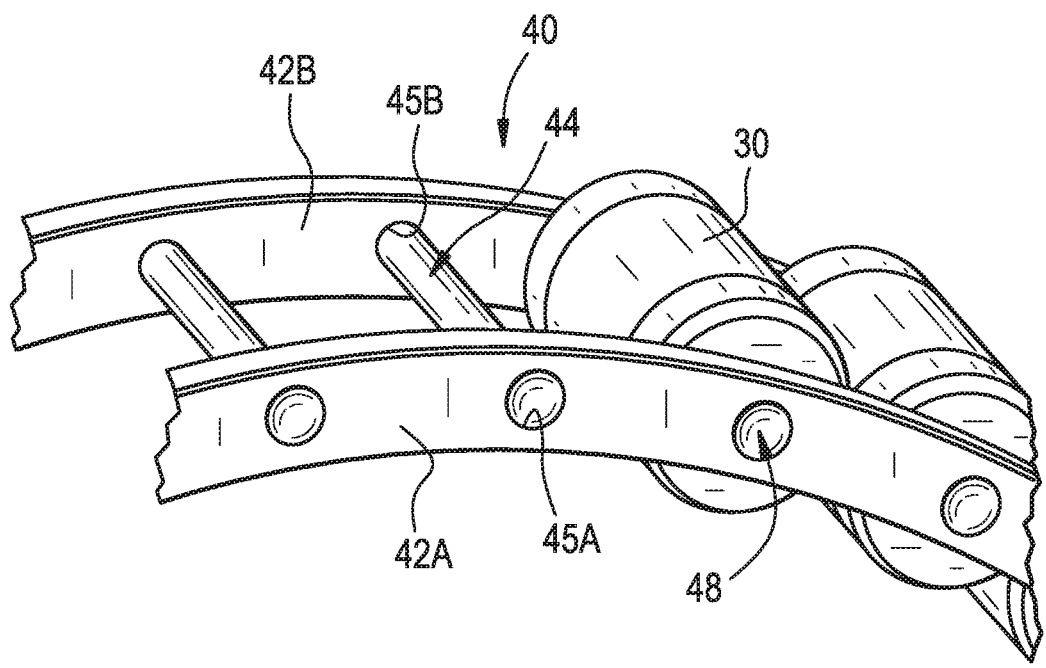
FIG. 5 is a perspective view of a portion of the bearing assembly of the present invention.

As shown in FIGS. 3 and 4, the roller bearing assembly 20 includes a cage 40 that includes a first annular disc 42A and a second annular disc 42B each positioned axially outward from the plurality of rolling elements 30. The first annular disc 42A has a plurality of holes 45A extending axially through a thickness thereof. The holes 45A are circumferentially equally spaced apart from one another. The second annular disc 42B has a plurality of holes 45B extending axially through a thickness thereof. The holes 45B are circumferentially equally spaced apart from one another. A plurality of pins 44 extend axially inward from the first annular disc 42A and the second annular disc 42B. As best shown in FIG. 5, each of the pins 44 extend between and are secured to the first annular disc 42A and the second annular disc 42B. Each of the pins 44 extend into a respect one of the holes 45A and a respective one of the holes 45B. Opposite ends of each of the pins 44 are secured (e.g., welded) in the respective one of the holes 45A and 45B. Each of the pins 44 extends completely through a respective bore 32 of one of the rolling elements 30 so that each of the rolling elements is rotatable about the respective pin 44. While the pins 44 are shown and described as extending completely through the respective bore 32, the present invention is not limited in this regard as the pins 44 may extend partially into the respective bore.

As best shown in FIG. 3, the pins 44, 44A, 44B are positioned on the first annular disc 42A so that each of rolling elements are spaced apart from one another with a gap G2 extending continuously and uninterrupted therebetween. Thus, there is no cage member or other guiding structure in the gap G2 or between adjacent rolling elements. The gap G2 is of a predetermined magnitude to maximize the number of rolling elements 30 that fit between the inner raceway 22A and the outer raceway 24A. For example, the gap G2 is sized to enable the roller bearing to add two or three additional rolling elements 30, over and above the number of rolling elements in a traditional roller bearing with a cage having fingers or cross bars spacing the rolling elements apart.

As shown in FIG. 3, an annular cavity 28 is defined between the inner raceway 22A and the outer raceway 24A. The annular cavity 28 has a circumferential volume and the plurality of rolling elements 30 is maximized to occupy that circumferential volume by minimizing the gap between rollers within the constraints of the movement permitted between the roller bore 32 and the pin 44.

The outer ring 22 and the inner ring 24 are manufactured from a metallic material such as a bearing steel (e.g., AISI 52100). In one embodiment, the inner ring 24 and/or the outer ring 22 are manufactured from a vacuum de-gassed steel having an oxygen content controlled to less than 10 ppm. The first annular disc 42A and the second annular disc 42B are manufactured from a metallic material such as a plain carbon steel (e.g., AISI 1018 or 1020). The pins 44, 44A, 44B are manufactured from a metallic material such as a carburizing steel grade (e.g., AISI 8620). The rolling elements 30 are manufactured from a metallic material such as a carburizing bearing steel (e.g., AISI 3310).

The roller bearing assembly 20 is configured to withstand a range of loads from zero to a predetermined percentage of full dynamic capacity of the bearing assembly 20 with the inner ring 24 rotating at up to 300 rotations per minute. In one embodiment the bearing assembly 20 has a dynamic load capacity of about 15 percent above that of a traditional bearing assembly having two or three less rolling elements than the bearing assembly 20.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A roller bearing assembly for use in a fracking pump crank shaft, the roller bearing assembly comprising:
    an outer ring having an inner raceway;
    an inner ring having an outer raceway, the inner ring being positioned at least partially in the outer ring;
    a plurality of rolling elements disposed between and in rolling engagement with the inner raceway and the outer raceway, a first of the plurality of rolling elements having a first bore extending axially at least partially therethrough and a second of the plurality of rolling elements having a second bore extending axially therethrough; and
    a cage having a first annular disc positioned axially outward from the plurality of rolling elements, a first pin extending axially inward from the first annular disc and a second pin extending axially inward from the first annular disc, the first pin extending into the first bore and the second pin extending into the second bore;
    wherein the first pin and the second pin are positioned on the first annular disc so that the first of the plurality of rolling elements and the second of the plurality of rolling elements are spaced apart from one another with a gap extending continuously therebetween, the gap being of a predetermined magnitude to maximize the number of rolling elements that fit between the inner raceway and the outer raceway;
    wherein an annular cavity is defined between the inner raceway and the outer raceway, the annular cavity having a circumferential volume, and wherein the plurality of rolling elements is maximized to occupy the circumferential volume, the gap having a minimized magnitude while permitting movement of the first of the plurality of rolling elements relative to the first pin and permitting movement of the second of the plurality of rolling elements relative to the second pin; and wherein at least one of the inner ring and the outer ring are comprised of a vacuum de-gassed steel having an oxygen content controlled to less than 10 ppm.

2. The roller bearing assembly of claim 1, wherein the cage comprises a second annular disc positioned opposite the first annular disc, wherein the plurality of rolling elements are positioned axially between the first annular disc and the second annular disc.

3. The roller bearing assembly of claim 2, wherein at least one of the first pin and the second pin extend between and are secured to the first annular disc and the second annular disc.

4. The roller bearing assembly of claim 2, wherein at least one of the first pin and the second pin extend between and are welded to the first annular disc and the second annular disc.

5. The roller bearing assembly of claim 1, wherein at least one of:

the first bore extends entirely axially through the first of the rolling elements; and the second bore extends entirely axially through the second of the rolling elements.

6. The roller bearing assembly of claim 5, wherein at least one of:

the first pin extends completely through the first bore; and the second pin extends completely through the second bore.

7. The roller bearing assembly of claim 1, wherein the first of the rolling elements is rotatably mounted on the first pin and the second of the rolling elements is rotatably mounted on the second pin.

8. The roller bearing assembly of claim 1, wherein:

(a) the outer ring and the inner ring are manufactured from a vacuum de-gassed steel having an oxygen content controlled to less than 10 ppm;

(b) the first annular disc and the second annular disc are manufactured from a plain carbon steel;

(c) the pins are manufactured from a carburized steel; and (d) the rolling elements are manufactured from a carburized bearing steel.

* * * * *